UNITED STATES PATENT OFFICE.

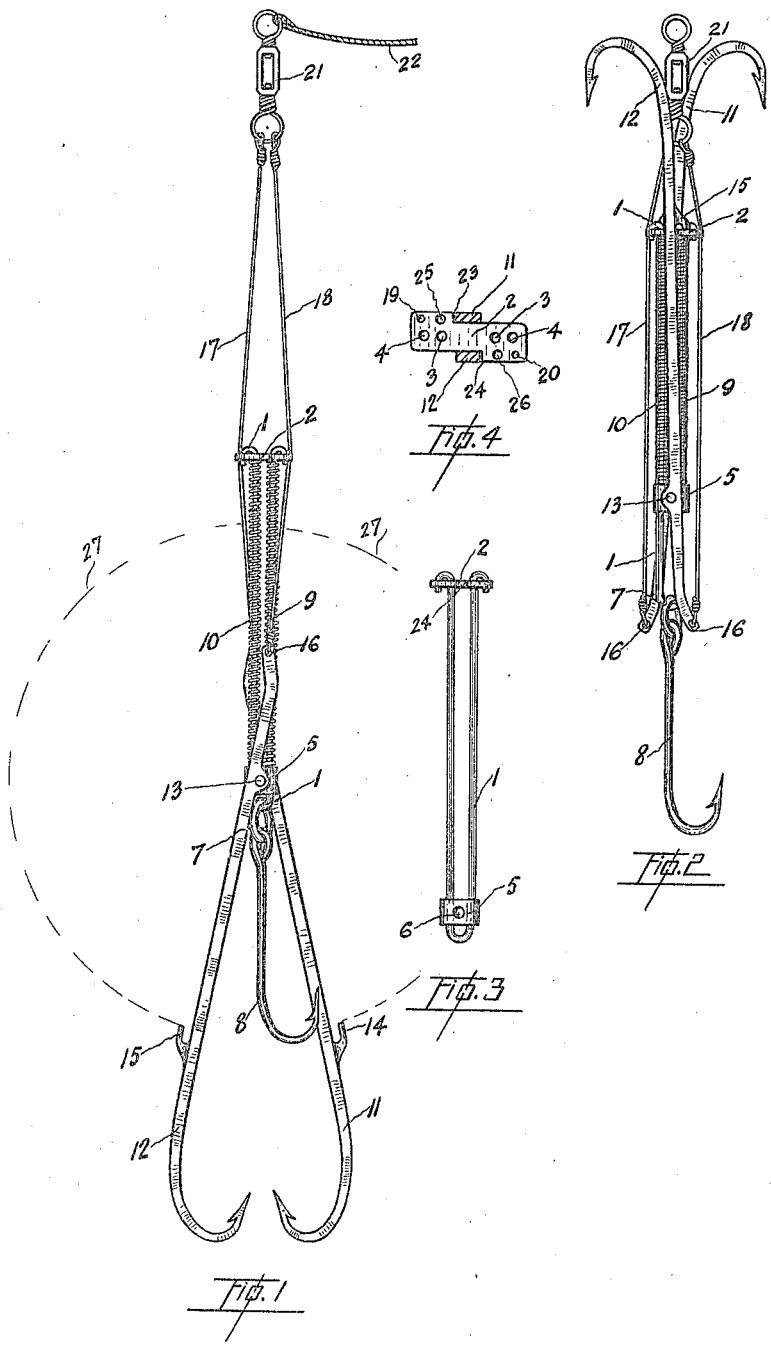

JOHN SPENCER EVANS, OF VANCOUVER, BRITISH COLUMBIA, CANADA, ASSIGNOR OF ONE-HALF TO ALBERT LAMAR SNOW, OF VANCOUVER, BRITISH COLUMBIA, CANADA.

FISHING-HOOK.

1,180,120.  Specification of Letters Patent.  Patented Apr. 18, 1916.

Application filed June 22, 1915. Serial No. 35,575.

*To all whom it may concern:*

Be it known that I, JOHN SPENCER EVANS, a citizen of the United States, and a resident of the city of Vancouver, in the Province of British Columbia, Canada, have invented certain new and useful Improvements in Fishing-Hooks, of which the following is a specification.

My invention relates to improvements in fishing hooks, and the object of my invention is to provide a device having gripping hooks adapted to be maintained in a normally inoperative position as long as the bait is undisturbed but which, when a pull is exerted on the bait, are automatically operated thereby to swing laterally toward each other to grip the fish between them.

A further object is to provide a means whereby the gripping hooks of the said device will, when they have been swung laterally, as above mentioned, to strike the fish, also move upwardly so as to embed the hooks securely into the body of the fish.

A still further object is to provide means for positively locking the said gripping hooks in their inoperative positions so that they cannot operate until a pull is exerted on the bait.

I attain these objects by the construction illustrated in the accompanying drawings in which—

Figure 1 is a view of the complete device, the gripping hooks being shown released. Fig. 2 is a view of the device showing the gripping hooks in their inoperative positions and locked. Fig. 3 is a detail view of the frame. Fig. 4 is an enlarged detail view, in plan, of the locking plate.

Similar figures of reference indicate similar parts throughout the several views.

1 indicates the frame of the device, which frame is preferably constructed of strong wire and is U-shape in formation, the ends of the wire being held apart, and rigidly secured into, a plate 2, in any approved manner such as that shown more particularly in Fig. 3, that is, the ends of the wire are driven tightly through holes 3 in the plate 2 and then turned over and passed tightly through similar holes 4 in the plate.

5 indicates a block slidably mounted on the frame 1 and provided with a central opening 6. The lower end of the frame 1 is provided with a ring 7 to which a bait hook 8 is attached.

9 and 10 indicate coil springs carried by the parallel legs respectively of the frame 1 and disposed between the plate 2 and the block 5, as shown in Figs. 1 and 2.

The gripping hooks, preferably formed of flat section and indicated by 11 and 12 respectively, are mounted one on each side of the frame and are pivotally secured to the block 5 by means of a pin 13, which passes through both hooks and the opening 6 in the block. At a suitable point each gripping hook is provided with a pin member, 14 and 15 respectively, as shown in Fig. 1, these pin members being preferably formed integrally with the body of the respective hooks, while the plain ends of the hooks are provided with holes 16 and adapted for attachment respectively to the wires 17 and 18, which wires are passed through holes 19 and 20 in the plate 2 and connected to a swivel 21, to which swivel the fishing line 22 is attached.

The locking plate 2 is provided with a notch on each side, 23 and 24 respectively, against which the respective hooks 11 and 12 rest when in their upmost position, as shown in Fig. 2, while 25 and 26 are openings in the plate adapted to receive the pin members 14 and 15 and lock the hooks in their inoperative positions, as more fully hereinafter described.

Having thus indicated the principal parts of the invention, I will now describe the manner in which it operates.

When the gripping hooks 11 and 12 are released, the device is as shown in Fig. 1, from which view it will be noted that the block 5 is then at the bottom of the frame 1, the springs 9 and 10 being extended. To prepare the device for fishing, the hooks 11 and 12 are swung upwardly to the vertical position, but as, in this position, the pin members 14 and 15 are below the locking plate 2, as indicated by the dotted line 27 in Fig. 1, it is therefore necessary to draw both hooks upward until the points of the pin members 14 and 15 are above their respective openings 25 and 26 in the plate 2, when the hooks may be released and the springs 9 and 10, which are now compressed between the block 5 and plate 2, as shown in Fig. 2, will draw the hooks downwardly and therefore the pin members 14 and 15 into their respective openings 25 and 26. It will thus be seen that the hooks 11 and 12 cannot now operate until they are raised sufficiently for the pin members 14 and 15 to clear the plate 2. When the hook 8 is baited, the device is now ready for use.

On the fish seizing the bait the pull on the wires 17 and 18 first of all raises hooks 11 and 12 sufficiently so that the pin members 14 and 15 are drawn out of their respective openings 25 and 26, when, being clear of the plate 2, the continued strain on the wires causes the hooks 11 and 12 to swing downwardly and inwardly, driving them into the body of the fish, which is thus held between them, this action being greatly accelerated by the springs 9 and 10 which, when the pin members 14 and 15 are raised clear of the plate 2, are thus freed from compression and, extending, drive the block 5 downwardly to the lower end of the frame 1 so as to throw the barbed ends of the hooks around quickly. It will be seen further that when the hooks 11 and 12 have entered the body of the fish the continued strain on the wires will draw the hooks upwardly, as they may then move upward on the frame an amount equal to that required to compress the coil springs 9 and 10.

What I claim as my invention is:—

1. A fishing hook, comprising a frame, a barbed member pivotally connected to said frame and mounted for slidable upward movement thereon, and a locking device on said member adapted to engage said frame to maintain said member when swung upwardly in a normally vertical position and to be disengaged therefrom to permit said member to swing downwardly and inwardly when a pull is exerted on the frame.

2. A fishing hook, comprising a frame, a pair of hooks pivotally connected to said frame and mounted for slidable upward movement thereon, a plate carried by the upper end of the frame and provided with openings, and locking pins on the hooks adapted to engage the said openings when the hooks are in the vertical position and to be withdrawn therefrom to permit downward and inward movement of the hooks when a pull is exerted on the frame.

3. A fishing hook, comprising a substantially U-shaped frame, a locking plate provided with openings secured to the upper end of the frame, a block slidably carried by the frame, a pair of hooks disposed on each side of said frame and pivotally connected to said block, spring means disposed between said block and said locking plate, locking pins on the said hooks adapted for engagement in the openings of the said locking plate, and means for connecting said hooks to a line.

4. A fishing hook, comprising a substantially U-shaped frame, a locking plate provided with openings secured to the upper end of the frame, said plate having a notch on each side, a block slidably mounted on said frame, a pair of hooks pivotally connected to said block on each side thereof, a coil spring carried by each leg of the frame between said block and said locking plate, pin members on the said hooks adapted for engagement in the openings of the said plate, a flexible connection for each hook, each flexible connection being secured to the plain end of the said hook and passed through an opening of the said plate and having its free end adapted for attachment to a line, and a bait hook secured to the lower end of said frame.

5. A fishing hook, comprising a frame, a hook secured to the lower end of said frame, a pair of hooks pivotally and slidably mounted on said frame on opposite sides thereof and arranged to swing upwardly to a normally vertical position, means for locking said hooks to the frame in their normal position, spring means carried by the frame and adapted to be held in compression by the hooks when locked and means for connecting said hooks to a line so that a pull on the line will free the hooks and cause them to be swung downwardly and inwardly and then drawn upwardly.

6. The combination with a fish hook, of a barbed member and means operated by a pull on the hook for carrying such barbed member in a lateral direction into the fish, said means being adapted to then draw the barbed member into the body of the fish in an upward direction.

7. The combination with a fish hook, of a pair of barbed members located to each side of the hook, and means operated by the pull on the hook for carrying the barbed members laterally into the fish, said means being adapted to then draw the barbed members into the body of the fish in an upward direction.

8. The combination with a fish hook, a frame attached thereto, of a barbed member pivotally connected to the frame, and normally supported thereon in a vertical position, and means connected to the barbed member adapted to carry the barbed end thereof first downwardly and inwardly and then upwardly when a pull is exerted on the hook.

9. The combination with a fish hook and a frame attached thereto, of a barbed member pivotally connected to said frame and normally supported thereon in a vertical position, means connected to the barbed member adapted to carry the barbed end thereof first downwardly and inwardly and then upwardly when a pull is exerted on the hook, and means for accelerating the downward and inward movement of the said barbed member.

Dated at Vancouver, B. C., this 28th day of May 1915.

JOHN SPENCER EVANS.

Witnesses:
James Taylor,
Isobel D. Orr.